US005972423A

United States Patent [19]

Abbey et al.

[11] Patent Number: 5,972,423

[45] Date of Patent: Oct. 26, 1999

[54] PRIMERLESS SUBSTRATE REPAIR WITH POLYEPOXIDE AND POLYTHIOL

[75] Inventors: Kirk J. Abbey, Raleigh; Mark W. Pressley, Apex, both of N.C.; Ruth M. Bennett, Erie, Pa.

[73] Assignee: Lord Corporation, Cary, N.C.

[21] Appl. No.: 09/128,605

[22] Filed: Aug. 3, 1998

[51] Int. Cl.[6] .............................. B32D 35/00; B05D 3/02; C08L 63/02

[52] U.S. Cl. .......................... 427/140; 427/142; 427/386; 525/504; 525/505; 525/523

[58] Field of Search .................................... 525/504, 505, 525/535, 523; 427/142, 386, 140

[56] References Cited

U.S. PATENT DOCUMENTS

| | | | |
|---|---|---|---|
| 3,882,091 | 5/1975 | Villa | 525/523 |
| 4,177,173 | 12/1979 | Carr | 525/507 |
| 4,623,702 | 11/1986 | Grieves et al. | 525/528 |
| 5,143,999 | 9/1992 | Setiabudi et al. | 525/505 |
| 5,214,098 | 5/1993 | Setiabudi et al. | 525/504 |
| 5,374,668 | 12/1994 | Kanemura et al. | 523/451 |
| 5,430,112 | 7/1995 | Sakata et al. | 525/504 |
| 5,470,605 | 11/1995 | Lundeen | 427/11 |
| 5,604,271 | 2/1997 | Lundeen | 523/454 |

FOREIGN PATENT DOCUMENTS

| | | |
|---|---|---|
| 5-112632 | 10/1991 | Japan . |

*Primary Examiner*—Robert E. Sellers
*Attorney, Agent, or Firm*—Wayne W. Rupert

[57] ABSTRACT

A primerless method for repairing a substrate surface that includes applying to the surface a curable filler composition that includes (i) an epoxy compound, (ii) a polythiol curing agent, and (iii) a catalyst and then curing the composition. The filler composition can also include a polyamine in addition to the catalyst.

16 Claims, No Drawings

PRIMERLESS SUBSTRATE REPAIR WITH POLYEPOXIDE AND POLYTHIOL

BACKGROUND OF THE INVENTION

The present invention relates to a method for repairing substrate surfaces with an epoxy filler composition that does not require the application of a primer to the surface prior to application of the epoxy composition.

The use of epoxy compositions as fillers for automotive vehicle body repairs is well known. However, current commercial epoxy fillers typically require the use of an adhesion-promoting primer that is applied to the substrate prior to application of the filler. For example, U.S. Pat. Nos. 5,470,605 and 5,604,271 are directed to such a primer that includes a first composition comprising an epoxy compound dispersed in a first volatile organic solvent and a second composition comprising a mercaptan-terminated polymer and an amine-functional material dispersed in a second volatile organic solvent.

The use of thiol-cured epoxy compositions as adhesives or sealers is also known. U.S. Pat. No. 4,623,702 relates to a two part adhesive or sealing system that includes a first part comprising 29–52 weight percent of an amine curable epoxy resin and 48–71 weight percent of an isocyanate prepolymer and a second part comprising an amine hardener, a tertiary amine as a primary accelerator and a mercaptan terminated polymer as a secondary accelerator. Certain diamines are listed as possible amine hardeners. The amount of amine hardener is 0.3 to 16.7 weight percent, based on the total weight of the epoxy resin and isocyanate prepolymer. Japanese Published Patent Application (Kokai) No. 05-112632 relates to an adhesive composition that includes an epoxy resin, a polymercaptan curing agent, and a reaction initiator. Tertiary amines and polyamine derived from certain diamines are listed as possible reaction initiators. There is no example that includes both a tertiary amine and a diamine.

A need exists for an epoxy filler that does not require pre-application of a primer.

SUMMARY OF THE INVENTION

According to the invention, there is provided a primeness method for repairing a substrate surface that includes applying to the surface a curable filler composition that includes (i) an epoxy compound, (ii) a thiol curing agent, and (iii) a catalyst and then curing the composition. The filler composition can also include a polyamine in addition to the catalyst.

The invention is especially useful for aesthetic repair of gouges, dents or scratches in rigid plastics or metal body panels, bumpers or other similar exterior parts of automotive vehicles. The invention can also be used to fill gaps between two different substrates such as between spliced steel panels. In other words, the composition of the invention is an automotive vehicle body filler that is particularly useful because it does not require the additional cost and time of pre-applying a primer.

Fillers must substantially completely occupy the void created by the damaged area, strongly adhere to the substrate material, and be capable of sanding to create a smooth exterior profile that matches the exterior profile of the undamaged substrate surface. The invention satisfies these needs because it provides excellent adhesion to a wide variety of substrates ranging from oil-covered steel to various plastics and balances open time with sanding time. Another important advantage of the present invention is that it is substantially free of volatile organic components.

DETAILED DESCRIPTION OF THE PREFERRED EMBODIMENTS

Unless otherwise indicated, description of components in chemical nomenclature refers to the components at the time of addition to any combination or mixture specified in the description, but does not necessarily preclude chemical interactions among the components of a mixture once mixed.

As used herein, “primary components” means the epoxy compound and the thiol curing agent.

The epoxy compound can be any compound that contains an epoxy group having the formula:

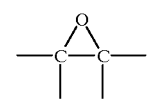

The epoxy compound preferably has a viscosity of at least 50 to 50,000 centipoise at 25° C. Such materials, also known as epoxides, include monomeric epoxy compounds and epoxies of the polymeric type and can be aliphatic, cycloaliphatic, aromatic or heterocyclic. These materials generally have, on the average, at least 1.5, preferably at least 2 polymerizable epoxy groups per molecule. The polymeric epoxies include linear polymers having terminal epoxy groups (for example, a diglycidyl ether of a polyoxyalkylene glycol), polymer skeletal oxirane units (for example, polybutadiene polyepoxide) and polymers having pendant epoxy groups (such as a glycidyl methacrylate polymer or copolymer). The epoxies may be pure compounds but are generally mixtures containing one, two or more epoxy groups per molecule. The “average” number of epoxy groups per molecule is determined by dividing the total number of epoxy groups in the epoxy-containing material by the total number of epoxy molecules present. The molecular weight of the epoxy compound may vary from 130 to 4,000 or more. Mixtures of various epoxy compounds can also be used.

The epoxy compounds may be cycloaliphatic or alicyclic epoxides. Examples of cycloaliphatic epoxides include diepoxides of cycloaliphatic esters of dicarboxylic acids such as bis(3,4-epoxycyclohexylmethyl)oxalate, bis(3,4-epoxycyclohexylmethyl)adipate, bis(3,4-epoxy-6-methylcyclohexylmethyl)adipate, bis(3,4-epoxycyclohexylmethyl)pimelate; vinylcyclohexene diepoxide; limonene diepoxide; dicyclopentadiene diepoxide; and the like. Other suitable diepoxides of cycloaliphatic esters of dicarboxylic acids are described, for example, in U.S. Pat. No. 2,750,395, incorporated herein by reference.

Other cycloaliphatic epoxides include 3,4-epoxycyclohexylmethyl-3,4-epoxycyclohexane carboxylates such as 3,4-epoxycyclohexylmethyl-3,4-epoxycyclohexane carboxylate; 3,4-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexylmethyl-3,4epoxy-2-methylcyclohexane carboxylate; 3,4-epoxy-3-methylcyclohexyl-methyl-3,4-epoxy-3-methylcyclohexane carboxylate; 3,4-epoxy-5-methylcyclohexyl-methyl-3,4epoxy-5-methylcyclohexane carboxylate and the like. Other suitable 3,4- epoxycyclohexylmethyl-3,4-epoxycyclohexane carboxylates are described, for example, in U.S. Pat. No. 2,890,194, incorporated herein by reference.

Further epoxy-containing materials which are particularly useful include those based on glycidyl ether monomers of the formula:

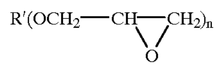

where R' is alkyl or aryl and n is an integer of 1 to 6. Examples are di- or polyglycidyl ethers of polyhydric phenols obtained by reacting a polyhydric phenol with an excess of chlorohydrin such as epichlorohydrin. Such polyhydric phenols include resorcinol, bis(4-hydroxyphenyl)methane (known as bisphenol F), 2,2-bis(4-hydroxyphenyl)propane (known as bisphenol A), 2,2-bis(4'-hydroxy-3',5'-dibromophenyl)propane, 1,1,2,2-tetrakis(4'-hydroxyphenyl)ethane or condensates of phenols with formaldehyde that are obtained under acid conditions such as phenol novolaks and cresol novolaks. Examples of this type are described in U.S. Pat. No. 3,018,262 and in "Handbook of Epoxy Resins" by Lee and Neville (McGraw-Hill Book Co. 1967), both incorporated by reference. Other examples include di- or polyglycidyl ethers of polyhydric alcohols such as 1,4-butanediol, or polyalkylene glycols such as polypropylene glycol and di- or polyglycidyl ethers of cycloaliphatic polyols such as 2,2-bis(4-hydroxycyclohexyl) propane. Other examples are monofunctional resins such as cresyl glycidyl ether or butyl glycidyl ether.

Another class of epoxy compounds are polyglycidyl esters and poly(β-methylglycidyl) esters of polyvalent carboxylic acids such as phthalic acid, terephthalic acid, tetrahydrophthalic acid or hexahydrophthalic acid.

A further class of epoxy compounds are N-glycidyl derivatives of amines, amides and heterocyclic nitrogen bases such as N,N-diglycidyl aniline, N,N-diglycidyl toluidine, N,N,N',N'-tetraglycidyl bis(4-aminophenyl) methane, triglycidyl isocyanurate, N,N'-diglycidyl ethyl urea, N,N'-diglycidyl-5,5-dimethylhydantoin, and N,N'-diglycidyl-5-isopropylhydantoin.

Still other epoxy-containing materials are copolymers of acrylic acid esters of glycidol such as glycidylacrylate and glycidylmethacrylate with one or more copolymerizable vinyl compounds. Examples of such copolymers are 1:1 styrene-glycidylmethacrylate, 1:1 methylmethacrylateglycidylacrylate and a 62.5:24:13.5 methylmethacrylate-ethyl acrylate-glycidylmethacrylate.

There are a host of commercially available epoxy-containing materials, commonly known as epoxy resins, that can be used as the epoxy compound. In particular, epoxy compounds that are readily available include octadecylene oxide, glycidylmethacrylate, diglycidyl ether of bisphenol A (such as those available under the tradenames EPON 828, EPON 1004 and EPON 1010 from Shell Chemical Co., DER-331, DER-332 AND DER-334 from Dow Chemical Co., and ARALDITE GY 6010 from Ciba-Geigy); vinylcyclohexene dioxide (such as that available under the tradename ERL-4206 from Union Carbide Corp.); 3,4-epoxycyclohexylmethyl-3,4-epoxycyclohexane carboxylate (such as that available under the tradename ERL-4221 from Union Carbide Corp.); 3,4-epoxy-6-methylcyclohexylmethyl-3,4-epoxy-6-methylcyclohexane carboxylate (such as that available under the tradename ERL-4201 from Union Carbide Corp.); bis (3,4-epoxy-6-methylcyclohexylmethyl) adipate (such as that available under the tradename ERL-4289 from Union Carbide Corp.); bis(2,3-epoxycyclopentyl) ether (such as that available under the tradename ERL-0400 from Union Carbide Corp.); aliphatic epoxy modified with polypropylene glycol (such as those available under the tradenames ERL-4050 and ERL-4052 from Union Carbide Corp.); dipentene dioxide (such as that available under the tradename ERL-4269 from Union Carbide Corp.); epoxidized polybutadiene (such as that available under the tradename OXIRON 2001 from FMC Corp.); silicone resin containing epoxy functionality; flame retardant epoxy resins (such as a brominated bisphenol type epoxy resin available under the tradename DER-580 from Dow Chemical Co.); 1,4-butanediol diglycidyl ether of phenolformaldehyde novolak (such as those available under the tradenames DEN431 and DEN438 from Dow Chemical Co.); and resorcinol diglycidyl ether (such as that available under the tradename KOPOXITE from Koppers Company Inc). The preferred epoxy compounds are di- or polyglycidyl ethers of polyhydric phenols, particularly diglycidyl ether of bisphenol A, and glycidyl ethers.

Thiol curing agents for epoxy compounds are well-known and are described, for example, in U.S. Pat. No. 5,374,668, but it has been discovered according to the present invention that thiol-cured epoxy exhibits superior adhesion to plastic substrates and does not require the use of a primer. As used herein, "thiol" also includes polythiol or polymercaptan curing agents. Illustrative thiols include aliphatic thiols such as methanedithiol, propanedithiol, cyclohexanedithiol, 2-mercaptoethyl-2,3-dimercaptosuccinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris(thioglycolate), pentaerythritol tetra(mercaptopropionate), pentaerythritol tetra(thioglycolate), ethyleneglycol dithioglycolate, trimethylolpropane tris(β-thiopropionate), tris-mercaptan derivative of tri-glycidyl ether of propoxylated alkane, and dipentaerythritol poly(β-thiopropionate); halogen-substituted derivatives of the aliphatic thiols; aromatic thiols such as di-, tris- or tetra-mercaptobenzene, bis-, tris- or tetra-(mercaptoalkyl)benzene, dimercaptobiphenyl, toluenedithiol and naphthalenedithiol; halogen-substituted derivatives of the aromatic thiols; heterocyclic ring-containing thiols such as amino-4,6-dithiol-sym-triazine, alkoxy-4,6-dithiol-sym-triazine, aryloxy-4,6-dithiol-sym-triazine and 1,3,5-tris(3-mercaptopropyl) isocyanurate; halogen-substituted derivatives of the heterocyclic ring-containing thiols; thiol compounds having at least two mercapto groups and containing sulfur atoms in addition to the mercapto groups such as bis-, tris- or tetra(mercaptoalkylthio) benzene, bis-, tris- or tetra(mercaptoalkylthio)alkane, bis (mercaptoalkyl) disulfide, hydroxyalkylsulfidebis (mercaptopropionate), hydroxyalkylsulfidebis (mercaptoacetate), mercaptoethyl ether bis (mercaptopropionate), 1 ,4-dithian-2,5-diolbis (mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bismuththiol and 2,5-dimercapto-1,3,4-thiadiazol. The preferred thiol curing agent is a tris-mercaptan derivative of tri-glycidyl ether of propoxylated alkane commercially available from Henkel Corp. under the trade designation CAPCURE 3-800 and having a generic structure represented by $$R\left[O(CH_2\underset{|}{\overset{CH_3}{C}}HO)_nCH_2\overset{OH}{\underset{|}{C}}HCH_2SH\right]_3$$

wherein R is an alkyl having from 1 to 5 carbon atoms and n is 1 to 2.

The amount of the epoxy compound and thiol curing agent can be any amount sufficient to react together to produce a filler. Preferably, the epoxy compound and thiol curing agent are present in amounts to provide an equivalent ratio of epoxy to thiol of about 0.9 to about 1.25. Outside of this range the filler has a cheesy or rubbery consistency or even is a tacky liquid because of the inadequate formation of a three-dimensional structural chemical network necessary for filler.

A polyamine may be included in the filler composition. As herein, "polyamine" means an amine with a functionality of greater than two reactive hydrogen atoms. Addition of the polyamine tends to increase the elastic modulus of the filler composition thereby improving sandability of the filler and the force required to break a test lap joint made with the filler. A low equivalent weight polyamine is desirable, particularly a polyamine having an equivalent weight of less than about 60 Daltons. Illustrative polyamines include polyimines such as diethylene triamine, triethylene tetraamine, tris(aminoethyl)amine and the like, diaminoalkanes such as 2-methyl-1,5-diaminopentane, 1,6-hexamethylenediamine and 1,3-propanediamine, and ring-containing diamines such as 1,3-bis(aminomethyl)cyclohexane, m-xylenediamine, methylene bis(4,4'-aminocyclohexane), 1,2-diaminocyclopentane, 1,3-diaminocyclohexane and the like. Ring-containing diamines are particularly preferred. The polyamine can be used in any amount, but the equivalent amount should not be so great as to prevent gelation of the faster curing thiol with the epoxy compound. The amount of polyamine can be estimated as shown in Flory, P. J., *Principals of Polymer Chemistry,* pp. 347–398 (Cornell University Press 1953). For example, with a difunctional epoxy compound and a trifunctional thiol curing agent the amount of thiol curing agent and polyamine may be such that the equivalent ratio of epoxy to the combination of thiol and polyamine is about 0.9 to about 1.25. Preferably, the amount of polyamine is less than one-half, more preferably less than one-quarter, the amount of thiol curing agent on an equivalent weight basis relative to the amount of active hydrogen atoms. If insufficient polyamine is included, the resulting filler may have poor sanding characteristics. If excessive polyamine is included, the cure rate decreases. The polyamine additive is different than, and is in addition to, the catalyst.

The catalyst or accelerator can be a nucleophilic substance such as an amine, a tertiary phosphine, quaternary ammonium salt with a nucleophilic anion, a quaternary phosphonium salt with a nucleophilic anion, an imidazole, tertiary arsenium salt with a nucleophilic anion and a tertiary sulfonium salt with a nucleophilic anion. Possible amine catalysts include primary, secondary and tertiary amines. Various mixtures of catalysts can be used.

Amine catalysts (particularly tertiary amines, amidines and guanidines) are preferred to balance the open time with the sanding time and are described, for example, in U.S. Pat. No. 5,385,990, incorporated herein by reference. Illustrative amines include methyldiethanolamine, triethanolamine, diethylaminopropylamine, benzyldimethyl amine, m-xylylenedi(dimethylamine), N,N'-dimethylpiperazine, N-methylpyrrolidine, N-methyl hydroxypiperidine, N,N,N'N'-tetramethyldiaminoethane, N,N,N',N',N'-pentamethyldiethylenetriamine, tributyl amine, trimethyl amine, diethyldecyl amine, triethylene diamine, N-methyl morpholine, N,NN'N'-tetramethyl propane diamine, N-methyl piperidine, N,N'-dimethyl-1,3-(4-piperidino) propane, pyridine and the like. Particularly preferred amines are 1,8-diazobicyclo[5.4.0]undec-7-ene, 1,8-diazabicyclo [2.2.2]octane, 4-dimethylaminopyridine, 4-(N-pyrrolidino) pyridine, triethyl amine and 2,4,6-tris (dimethylaminomethyl)phenol, with 1,8-diazobicyclo [5.4.0]undec-7-ene being especially preferred.

Aliphatic polyamines that are modified by adduction with epoxy resins, acrylonitrile or (meth)acrylates can also be utilized as amine catalysts. In addition, various Mannich bases can be employed as amine catalysts. Aromatic amines wherein the amine groups are directly attached to the aromatic ring can also be used. A particularly attractive aromatic amine is 1,8-bis(dimethylamino)naphthalene.

The amount of catalyst can be from about 0.1 to 5.0, preferably 0.2 to 1.0 weight percent, based on the total weight of the primary components. If less than 0.1 weight percent of catalyst is present, the reaction rate could be slower than desired. If more than 5.0 weight percent of catalyst is present, the reaction rate can become so fast that dispensing of the filler is inhibited, a large amount of low molecular weight material will act as a plasticizer after cure and the catalyst residue can bloom to the surface causing aesthetic problems.

The composition may also include additives and fillers conventionally found in epoxy systems such as silica, glass, talc, metal powders, titanium dioxide, wetting agents, pigments, coloring agents and the like.

The composition is preferably utilized as a two-part system. If employed as a two-part system, the first part includes the epoxy compound and the second part includes the thiol curing agent, the polyamine and the catalyst. The ingredients of each part are mixed together by means well-known in the art.

In the preferred two-part system the two parts are mixed together a predetermined time prior to use in a volume ratio of first part:second part of 1:10 to 10:1, preferably 1:1. Preferably, the two parts are mixed together immediately before use, but the composition has an open time of 1 to 60, preferably 3 to 10, minutes. As used herein, "open time" denotes the time from mixing of the parts to the time at which the mixed composition cures to a point that it is no longer workable.

The epoxy filler is applied by conventional means to the damaged area so as to substantially completely fill all the voids. After the epoxy filler composition is applied to the damaged area, the filled substrate typically is allowed to stand to complete curing from about 10 to 60 minutes after becoming unworkable. After completion of cure, the filled surface is smoothed by conventional sanding means. The sanding time can vary greatly depending upon the components and the amount of the polyamine, but is approximately proportional to the open time. Curing of the filler can be effected in air at ambient temperature and moisture. Slight to moderate heating to a filler temperature of less than about 250° F. using hot air guns or heat lamps can accelerate curing.

The substrates that can be repaired include metallic and plastic substrates. Illustrative metallic substrates include steel, iron, aluminum, brass, copper and the like. Examples of plastics include fiber-reinforced plastics (FRP) such as glass-filled epoxy resins and glass-filled polyesters, polyureas and polycarbonates. Particularly common substrates are steel, sheet molding compound (SMC), reaction injection molded (RIM) polyurethane and thermoplastic polyolefins.

Illustrative plastic substrates include thermoplastic polyolefins known under the trade designations "ETA-3163" and "ETA-3095" (available from Himont U.S.A. Inc.), "Lomod XA-1320" (an engineered elastomer available from GE Plastics), "GTX-910" (a polyphenylene oxide/nylon rubber available from GE Plastics), "Xenoy" (a polycarbonate/polybutylene terephthalate blend available from GM Plastics), thermoplastic elastomer blends known under the trade designations "Bexloy V-978" and "Bexloy V-572" (available from DuPont), polycarbonate/acrylonitrile-butadiene-styrene blend available from Dow Chemical under the trade designation "Pulse", "Bayflex 150" (a polyurethane available from Bayer), and "Bayflex 150" (a polyurea available from Bayer).

A preferred embodiment will be described in more detail with reference to the example below.

EXAMPLE 1

Side A of a filler composition is made by mixing together 80 g of diglycidyl ether of bisphenol A (commercially available from Ciba-Geigy under the trade designation ARALDITE GY-6010), 0.5 g of dispersant (commercially available from Byk Chemie under the trade designation BYK-W 9010), 16 g of glass bubbles/spheres, and 3 g of silica. Side B of the filler composition is made by mixing together 71 g of tris-mercaptan derivative of tri-glycidyl ether of propoxylated alkane (commercially available from Henkel under the trade designation CAPCURE 3-800), 1.5 g of m-xylenediamine, 0.5 g of 1,8-diazobicyclo[5.4.0] undec-7-ene (commercially available from Air Products under the trade designation POLYCAT DBU), 20 g of talc (commercially available from Luzenac under the trade designation NICRON 353), 4 g of glass bubbles/spheres and 3 g of silica. Sides A and B then are mixed together at an equal volume ratio. The ratio of the epoxy equivalents to the sum of the thiol and diamine components is 1:1.

EXAMPLE 2

Side A of a filler composition is made by mixing together 64 g of a diglycidyl ether of bisphenol A (commercially from Dow Chemical under the trade designation D.E.R. 362, 33 g of glass bubbles/spheres and 3 g of silica. Side B of the composition is made by mixing together 73 g of CAPCURE 3-800, 0.6 g of POLYCAT DBU, 18 g of talc (commercially available from Luzenac under the trade designation BEAVERWHITE), 7 g of glass bubbles/spheres and 2 g of silica. Sides A and B then are mixed together at an equal volume ratio. The ratio of the epoxy equivalents to the thiol is 1:1.

EXAMPLE 3

Side A of a filler composition is made by mixing together 70 g of GY-6010, 28 g of Beaverwhite 325 talc, and 2 g of silica. Side B of the composition is made by mixing together 66 g of pentaerythritol mercaptopropionate (commercially available from Evans Chemetics), 0.6 g of POLYCAT DBU, 29 g of glass bubbles/spheres and 4 g of silica. Sides A and B then are mixed together at an equal volume ratio. The ratio of the epoxy equivalents to the thiol is 1:1.

The Side A/B mixtures of the Examples were applied to one surface of each of the substrates identified in Table 1 below and then another substrate made from the same material was contacted with the filler-applied substrate and the filler was allowed to cure. The adhesive strength of these examples was tested according to a lap joint test (ASTM D-1002 for metal-to-metal and ASTM D-3163 for rigid plastic-to-rigid plastic) and a side impact test (General Motors test procedure GM9751P) and the results are shown in Table 1. "CRS" denotes cold-rolled steel, "RT" denotes room temperature, lap joint is measured in psi, side impact is measured in in.-lbs, "SMC" denotes sheet molding compound, substrate 7170 is commercially available from Gencorp, and substrate A-7 is commercially available from Premix.

TABLE 1

| Substrate & Property tested | Example 1 | Example 2 | Example 3 |
|---|---|---|---|
| CRS RT lap joint | 1562 | 630 | 1761 |
| CRS RT side impact | 76 | 77 | 21 |
| CRS −30° C. side impact | 26 | 21 | 8 |
| 7170 SMC RT lap joint | 524 | 630 | 375 |
| 7170 SMC RT side impact | 82 | 85 | 36 |
| 7170 SMC −30° C. side impact | 65 | 62 | 26 |
| A-7 SMC RT lap joint | 704 | NT | NT |
| A-7 SMC RT side impact | 92 | NT | NT |
| A-7 SMC −30° C. side impact | 89 | NT | NT |
| Open time (minutes) | 5 | 5 | 4 |

What is claimed is:

1. A method for repairing a surface of a plastic automotive vehicle part without the use of a primer comprising applying to the surface a curable filler composition that includes (i) an epoxy compound having at least 1.5 epoxy groups per molecule, (ii) a polythiol curing agent, (iii) and a catalyst and then curing the composition.

2. A method according to claim 1 wherein the epoxy compound is a polyglycidyl ether epoxy.

3. A method according to claim 1 wherein the thiol curing agent is selected from the group consisting of an aliphatic polythiol, an aromatic polythiol, a heterocyclic-ring containing polythiol, and a polythiol compound having at least two mercapto groups and containing sulfur atoms in addition to the mercapto groups.

4. A method according to claim 1 wherein the catalyst is selected from the group consisting of an amine, a tertiary phosphine, a quaternary ammonium salt of a nucleophilic anion, a quaternary phosphonium salt of a nucleophilic anion, and an imidazole.

5. A method according to claim 1 wherein the curable composition further comprises a polyamine that is different than the catalyst.

6. A method according to claim 5 wherein the polyamine is selected from polyimines, diaminoalkanes and ring-containing diamines.

7. A method according to claim 4 wherein the catalyst is an amine.

8. A method according to claim 7 wherein the curable composition further comprises a polyamine that is different than the amine catalyst, the epoxy compound is a polyglycidyl ether epoxy and the polythiol curing agent is selected from an aliphatic polythiol, an aromatic polythiol, a heterocyclic-ring containing polythiol, and a polythiol compound having at least two mercapto groups and containing sulfur atoms in addition to the mercapto groups.

9. A method according to claim 1 wherein the curable composition is substantially free of any volatile organic component.

10. A method according to claim 8 wherein the epoxy compound, polythiol curing agent and polyamine are present in amounts to provide an equivalent ratio of epoxy to the combination of polythiol and polyamine of about 0.9 to about 1.25.

11. A method according to claim 1 wherein the epoxy compound and polythiol curing agent are present in amounts to provide an equivalent ratio of epoxy to thiol of about 0.9 to about 1.25.

12. A method according to claim 1 wherein the curable composition is a two part composition wherein the first part includes the epoxy compound, the second part includes the polythiol curing agent and the catalyst, and curing is effected by mixing the first part and the second part.

13. A method according to claim 12 wherein the second part further comprises a polyamine.

14. A method according to claim 1 wherein after the filler is cured the filled surface is sanded to provide a smooth exterior profile that matches the exterior profile of the undamaged substrate surface.

15. A method according to claim 1 wherein curing is effected in air at ambient temperature and moisture.

16. A method according to claim 1 wherein the part is a bumper.

* * * * *